(12) United States Patent
Berdy et al.

(10) Patent No.: US 11,070,421 B2
(45) Date of Patent: Jul. 20, 2021

(54) COMBINED REGISTRATION AND TELEMETRY REPORTING

(71) Applicant: Microsoft Technology Licensing, LLC, Redmond, WA (US)

(72) Inventors: Nicole E. Berdy, Kirkland, WA (US); Alexander I. Tolpin, Redmond, WA (US); Tamer A. Awad, Redmond, WA (US); Rajeev Mandayam Vokkarne, Sammamish, WA (US); Puneet Gupta, Jersey City, NJ (US); Timothy James Larden, Bellevue, WA (US); Mounica Arroju, Redmond, WA (US); Jelani Z. Brandon, Woodinville, WA (US); SachinKumar Chandramohan, Irvine, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/358,582

(22) Filed: Mar. 19, 2019

(65) Prior Publication Data

US 2020/0304367 A1    Sep. 24, 2020

(51) Int. Cl.
*H04L 12/24* (2006.01)
*H04L 29/08* (2006.01)
*H04Q 9/00* (2006.01)

(52) U.S. Cl.
CPC .......... *H04L 41/0806* (2013.01); *H04L 67/12* (2013.01); *H04L 67/18* (2013.01);
(Continued)

(58) Field of Classification Search
CPC ..... H04L 41/0806; H04L 67/12; H04L 67/18; H04L 67/22; H04L 67/10; H04L 67/125;
(Continued)

(56) References Cited

U.S. PATENT DOCUMENTS 4,763,317 A * 8/1988 Lehman ............... H04J 14/0226
370/358
8,269,618 B2 * 9/2012 Murray ................. B60R 25/302
340/441

(Continued)

FOREIGN PATENT DOCUMENTS

EP    3047662 A1    7/2016
JP    08287147 A *  6/1999 ............... H04L 9/12

OTHER PUBLICATIONS

"Device Registration API", Retrieved from <<https://web.archive.org/web/20170803140933/https://www.eclipse.org/Hono/api/device-registration-api/>>, Aug. 3, 2017, 11 Pages.

(Continued)

*Primary Examiner* — Ayaz R Sheikh
*Assistant Examiner* — Louis Samara
(74) *Attorney, Agent, or Firm* — Alleman Hall Creasman & Tuttle LLP

(57) ABSTRACT

Examples are disclosed that relate to using a multiplexed transmission to register a telemetry device with a telemetry system and report telemetry data to the telemetry system on behalf of a telemetry device. One disclosed example provides a method comprising receiving a multiplexed transmission from a telemetry device, the multiplexed transmission comprising a registration message and telemetry data, demultiplexing the multiplexed transmission to obtain the registration message and the telemetry data, registering the telemetry device with a telemetry system based upon the registration message, sending the telemetry data to the telemetry system, and sending a registration response to the telemetry device, the registration response confirming registration of the telemetry device with the telemetry system.

19 Claims, 7 Drawing Sheets

(52) U.S. Cl.
CPC ............... *H04Q 9/00* (2013.01); *H04L 67/10* (2013.01); *H04Q 2209/823* (2013.01)

(58) Field of Classification Search
CPC ...... H04L 9/12; H04Q 9/00; H04Q 2209/823; H04J 14/0226
See application file for complete search history.

(56) References Cited

U.S. PATENT DOCUMENTS

| | | | | |
|---|---|---|---|---|
| 10,375,019 | B2* | 8/2019 | Clark | H04L 69/22 |
| 10,461,955 | B2* | 10/2019 | Ramirez | H04L 12/2838 |
| 10,492,204 | B2* | 11/2019 | Kakinada | H04L 69/18 |
| 2007/0282988 | A1* | 12/2007 | Bornhoevd | H04L 67/125 |
| | | | | 709/223 |
| 2011/0102189 | A1* | 5/2011 | Murray | B60R 25/102 |
| | | | | 340/870.07 |
| 2017/0093700 | A1* | 3/2017 | Gilley | H04L 63/20 |
| 2018/0109650 | A1* | 4/2018 | Berdy | H04L 63/123 |
| 2018/0131689 | A1 | 5/2018 | Vasters et al. | |
| 2018/0172855 | A1 | 6/2018 | Drange | |
| 2018/0176663 | A1* | 6/2018 | Damaggio | H04L 67/12 |

OTHER PUBLICATIONS

"Telemetry API", Retrieved from <<https://web.archive.org/web/20180305223537/https:/www.eclipse.org/hono/api/telemetry-api/>>, Mar. 5, 2018, 6 Pages.

Gremban, et al., "Quickstart: Send telemetry from a device to an IoT hub (iOS)", Retrieved from <<https://docs.microsoft.com/en-us/azure/iot-hub/quickstart-send-telemetry-ios>>, Apr. 20, 2018, 9 Pages.

Rastogi, Ashita, "A powerful and intuitive way to route device messages in Azure IoT Hub", Retrieved from <<https://azure.microsoft.com/en-in/blog/a-powerful-and-intuitive-way-to-route-device-messages-in-azure-iot-hub/>>, Sep. 24, 2018, 5 Pages.

"International Search Report and Written Opinion Issued in PCT Application No. PCT/US20/022207", dated Aug. 5, 2020, 21 Pages.

\* cited by examiner

COMBINED REGISTRATION AND TELEMETRY REPORTING

BACKGROUND

Internet of Things (IoT) devices, such as various sensors, may be configured to communicate telemetry data to an online service, such as a cloud-hosted IoT hub.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One disclosed example provides a method comprising receiving a multiplexed transmission from a telemetry device, the multiplexed transmission comprising a registration message and telemetry data, demultiplexing the multiplexed transmission to obtain the registration message and the telemetry data, registering the telemetry device with a telemetry system based upon the registration message, sending the telemetry data to the telemetry system, and sending a registration response to the telemetry device, the registration response confirming registration of the telemetry device with the telemetry system.

Another disclosed example provides a method comprising receiving telemetry data from a telemetry device, the telemetry data comprising location data, comparing the location data to a defined geographical boundary for the telemetry device, and when the location data does not meet a predefined condition with regard to the defined geographical boundary, then taking an action towards restricting use of the telemetry device.

DETAILED DESCRIPTION

As mentioned above, IoT devices may communicate telemetry data to a cloud-based telemetry service. Before such reporting of data may occur, the IoT device may register with the service via a provisioning process. Currently, different software development kits (SDKs) and application programming interfaces (APIs) may be used for telemetry device provisioning and telemetry data reporting, as the different types of communications may utilize different endpoints in a network-accessible IoT service. The use of multiple SDKs and/or APIs on a telemetry device to communicate with multiple service endpoints may require the IoT device to handle more complexity, and thus may pose relatively higher memory and processing requirements for the device. This may be particularly problematic for lower-power and/or lower-memory devices, which may lack nonvolatile storage to persistently store connection information for connecting to multiple endpoints over reboot cycles, thus requiring such devices to repeat the provisioning process at each reboot. As a more specific example, a medical alert device may be configured as a small, inexpensive, low-power device that only connects to an IoT solution upon detecting a predefined condition, such as a button press or voice command, and may not be configured to support multiple SDKs and APIs.

Accordingly, examples are disclosed that relate to a telemetry device configured to multiplex telemetry data with a registration message, and to communicate a multiplexed transmission comprising the registration message and the telemetry data to a single IoT endpoint. The IoT endpoint, referred to herein as a provisioning system, handles the complexity of provisioning the telemetry device to an associated IoT solution, referred to herein as a telemetry system, and also forwards telemetry data to the telemetry system on behalf of the telemetry device. This may help to reduce a memory and/or computational burden on the telemetry device by allowing the telemetry device to utilize a single SDK and API to perform stateless device provisioning and telemetry data reporting. Further, sending telemetry data with the registration message as a multiplexed transmission may help to improve efficiency and bandwidth usage of the telemetry reporting system.

Figure 1:
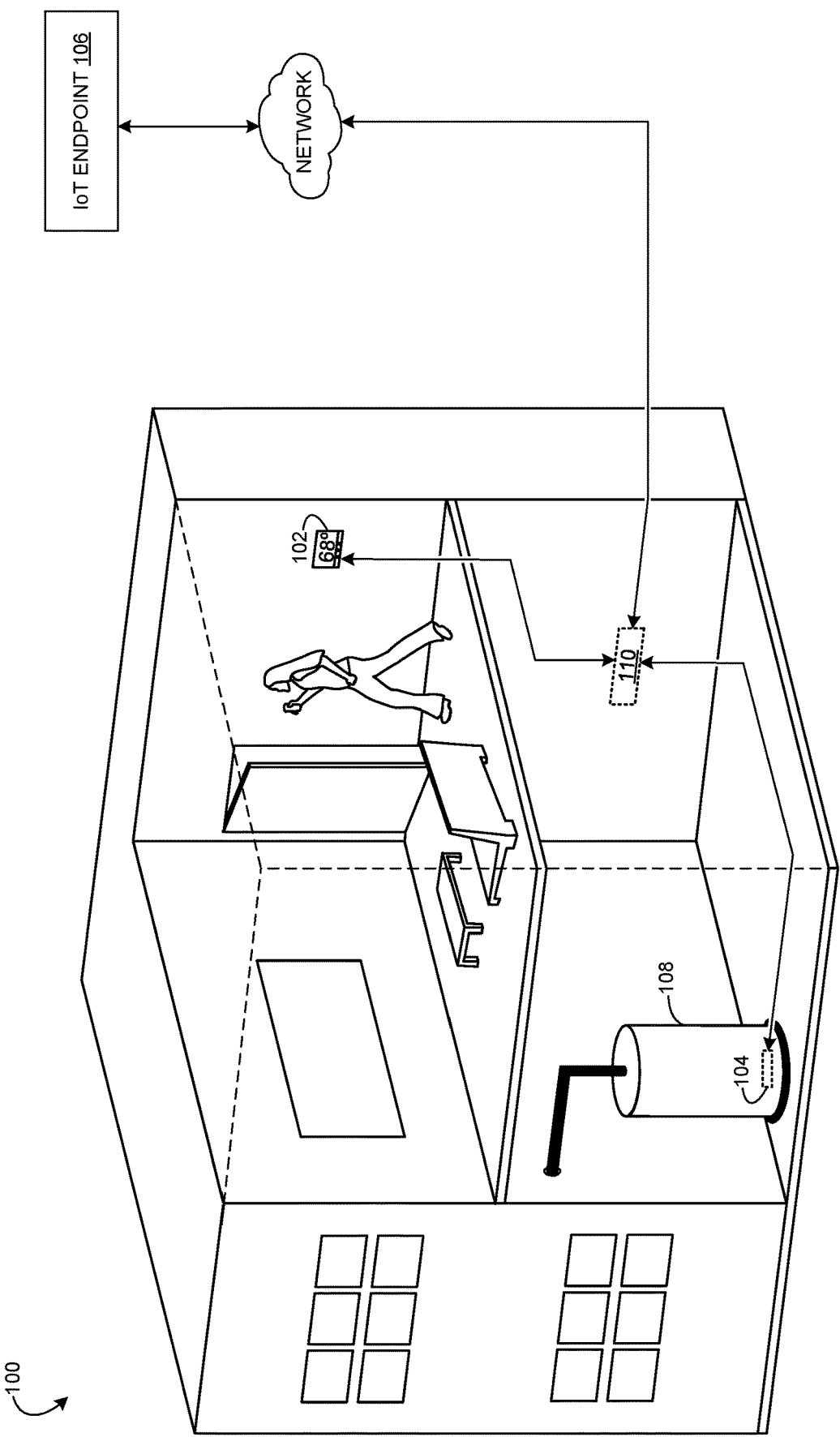
FIG. 1 shows an example use environment in which telemetry devices register with and report telemetry data to a single IoT endpoint.

FIG. 1 shows an example use environment 100 in which telemetry devices 102, 104 each send registration data and telemetry data to a single IoT endpoint 106. The example telemetry devices comprise a thermostat 102 and a sensor device 104 associated with a water heater 108. In some examples, such telemetry devices 102, 104 may be configured to report telemetry data on an occasional basis, such as upon sensing a predetermined condition. For example, the sensor device 104 may comprise a moisture sensor disposed beneath the water heater 108, and may be configured to report telemetry data to the IoT endpoint 106 upon sensing a presence of water. As another example, the thermostat 102 may be configured to transmit a measured temperature according to a schedule and/or whenever the measured temperature meets or exceeds a threshold. In other examples, a telemetry device(s) may report telemetry data at any suitable frequency and/or based on any other trigger. While shown as a residential environment 100 in the example of FIG. 1, the examples described herein may be implemented in any other suitable use environments and with any other telemetry device. Examples of other use environments include other indoor spaces, such as commercial spaces (e.g. offices, warehouses, retail stores, etc.), and outdoor spaces (e.g. farms, construction sites, parks, parking lots, etc.).

As mentioned above, sensing a presence of water may trigger the sensor device 104 to connect to a network. The sensor device 104 records the moisture sensor data as telemetry data, multiplexes the telemetry data with a registration message, and sends the multiplexed transmission to the IoT endpoint 106. The registration message may include, for example, identification information identifying the sensor device 104 to the IoT endpoint 106, a public portion of an X.509 certification, a public portion of a trusted platform module (TPM) endorsement key, a public portion of a TPM storage root key, latitude/longitude information, and/or information regarding a current configuration (e.g. firmware version). In the depicted example, the sensor device 104 communicates the multiplexed transmission to a local network access point 110, which transmits the received communications to the IoT endpoint 106 via a wide-area network (WAN). In other examples, a telemetry device may be configured to send the multiplexed transmission directly to an IoT endpoint, rather than via an intermediary access point.

The thermostat 102 also may send telemetry data on an occasional basis. For example, the thermostat 102 may be configured to report thermostat telemetry data according to a schedule or a threshold temperature (e.g. to help monitor home energy usage and/or regulate a household temperature). The thermostat 102 may remain in a low power state until a scheduled temperature reporting time or a threshold temperature is sensed, at which time the thermostat 102 may multiplex the measured data with a registration message, and send the multiplexed transmission.

Figure 2:
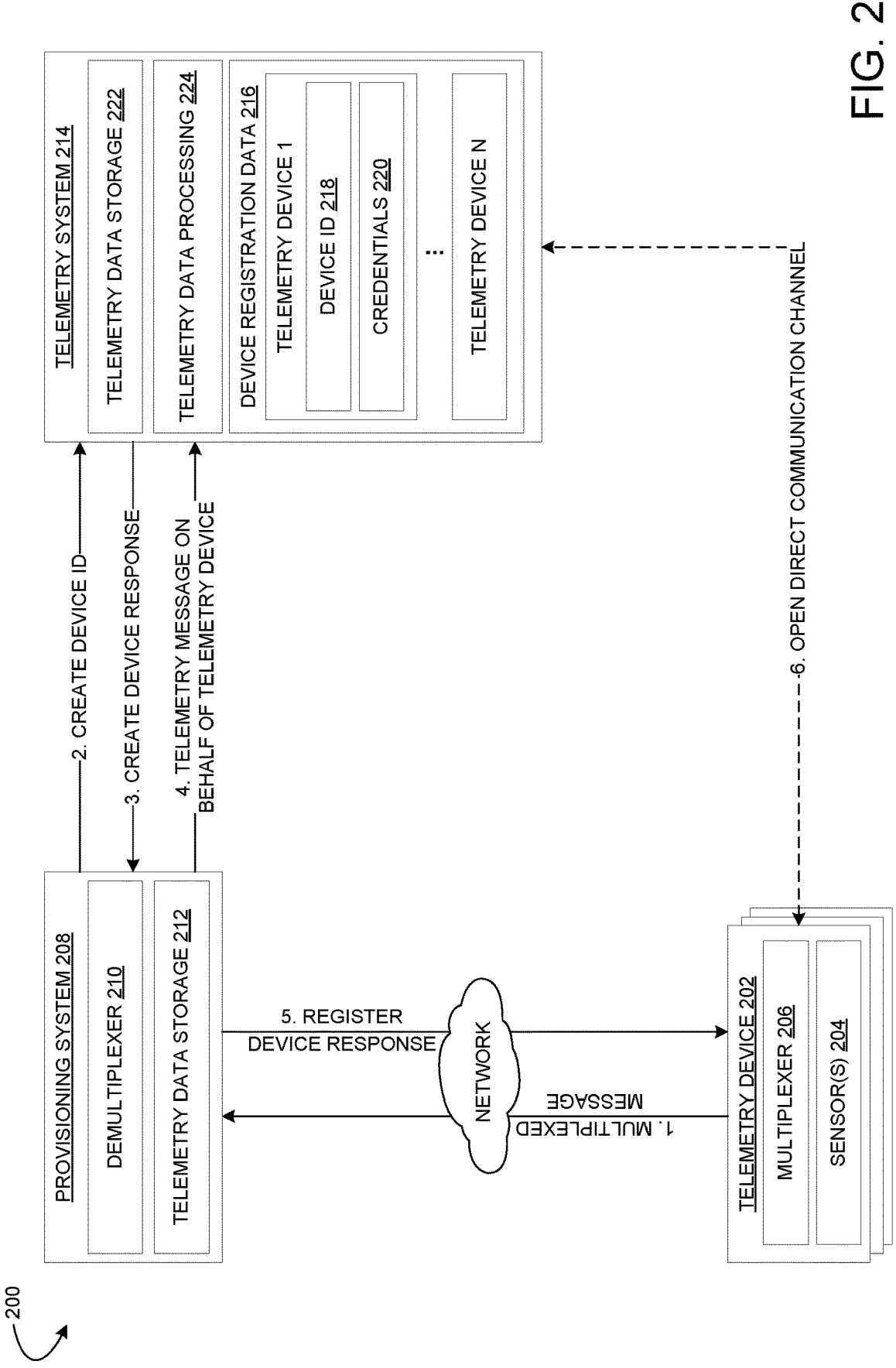
FIG. 2 is a block diagram illustrating an example system for performing device registration and telemetry reporting via a multiplexed message transmission.

FIG. 2 shows a block diagram illustrating an example system 200 for combined device provisioning and telemetry data reporting. System 200 comprises one or more telemetry devices 202, which may represent any suitable devices having sensors. Each telemetry device 202 comprises an embedded computing system, such as a microcontroller unit (MCU), a processor, a system-on-chip (SoC), etc. Example computing systems are described below with reference to FIG. 8. Further, each telemetry device 202 comprises one or more sensors 204. Any suitable sensor(s) may be used. Example sensors include chemical sensors, moisture sensors, touch sensors, pressure sensors, temperature sensors, global positioning system (GPS) sensors, humidity sensors, inertial motion sensors, image sensors (depth and/or visible light), photosensors, particulate sensors, smoke sensors, acoustic sensors, optical sensors, motion sensors, and proximity sensors.

Each telemetry device 202 further comprises a multiplexer 206 configured to combine telemetry data (raw and/or processed sensor data) and a registration message into a multiplexed message for transmission. The multiplexed message may comprise any suitable data structure for communicating both registration information and telemetry data. The multiplexed message is sent to the IoT endpoint (provisioning system 208) via a provisioning system API, as indicated by arrow 1 in FIG. 2.

In some examples, a multiplexed message transmission occurs upon each telemetry device start-up. This may allow the telemetry device 202 to include little persistent memory, as the telemetry device 202 may simply store instructions/code for contacting a single IoT endpoint (e.g. the provisioning system 208) each time the telemetry device 202 undergoes a boot process. In other examples, the telemetry device 202 may transmit a multiplexed transmission according to a schedule or another periodic basis, upon sensing a predefined condition (e.g. a measurement that meets or exceeds a threshold), upon receiving a reporting request from a system administrator, and/or based upon any other suitable trigger.

The provisioning system 208 comprises a demultiplexer 210 that separates the multiplexed message into the registration message and the telemetry data. After demultiplexing the multiplexed message, the provisioning system 208 stores the telemetry data in telemetry data storage 212 at least until the telemetry data is provided to a telemetry system. One example of the provisioning system 208 is Azure IoT Device Provisioning System (DPS), available from Microsoft Corp. of Redmond, Wash.

Based on the received registration message, the provisioning system 208 sends a device ID for the telemetry device 202 to a telemetry system 214, as indicated by arrow 2 in FIG. 2. One example of a telemetry system is Azure IoT Hub, available from Microsoft Corp. of Redmond, Wash. Sending the device ID to the telemetry system 214 configures the telemetry system 214 to receive telemetry data from the telemetry device 202 at some future time. In some examples, the provisioning system 208 may select from a plurality of possible telemetry systems a telemetry system with which to register the telemetry device 202 based on information received from the telemetry device 202, such as an IP address, a serial number, and/or a geographical location of the telemetry device 202 (e.g. as determined from global positioning satellite data).

The telemetry system 214 stores device registration data 216 for each associated telemetry device 1 through N registered/provisioned to the telemetry system 214. For each telemetry device 202, the device registration data 216 may include such information as the device ID 218 and security credentials 220 for connecting to and/or operating with the telemetry system 214.

After receiving the device ID, the telemetry system 214 creates and sends a device response for the telemetry device 202 to the provisioning system 208, as indicated by arrow 3 in FIG. 2. The device response may include, for example, an acknowledgement that the registration was successful or not successful. The device response also may include information regarding the success or failure to register the device with the telemetry system. Further, in examples where the telemetry device connects directly to the telemetry system after registration, the device response also may include information usable by the telemetry device 202 to connect to the telemetry system 214 and send data directly to the telemetry system 214.

Upon receiving the device response, the provisioning system 208 sends the telemetry data to the telemetry system 214, as indicated by arrow 4 in FIG. 2. This differs from provisioning and telemetry data reporting systems and methods in which device provisioning and telemetry reporting are performed separately using different SDKs/APIs, as the system of FIG. 2 allows a single endpoint to be used for both device registration and telemetry reporting, thereby allowing the telemetry device to have less memory and compute resources than a device that uses different SDKs/APIs for provisioning and telemetry reporting.

The telemetry system 214 receives the telemetry data from the provisioning system 208 and stores the telemetry data in telemetry data storage 222. The telemetry system 214 also may provide the telemetry data to one or more telemetry data processing programs 224.

After receiving the device response, the provisioning system 208 registers the device response with the telemetry device 202, as indicated by arrow 5 in FIG. 2. Upon the completion of registration, in some examples, the telemetry device 202 may continue to send telemetry data to the provisioning system 208 for forwarding to the telemetry system 214. This may be advantageous for telemetry devices that comprise limited or no nonvolatile storage, as such telemetry devices may continue to send telemetry data without persistently storing information for connecting to the telemetry system 214. In other examples, the telemetry device 202 may send telemetry data directly to the telemetry system 214. The telemetry device 202 may use connection information received from the provisioning system 208, e.g. in a registration response message, to open a direct communication channel with the telemetry system 214 and send additional telemetry data directly to the telemetry system 214, as indicated by arrow 6 in FIG. 2. In yet further examples, steps 1 through 5 of FIG. 2 may be performed in full each time a device sends telemetry data to the telemetry system.

Figure 3:
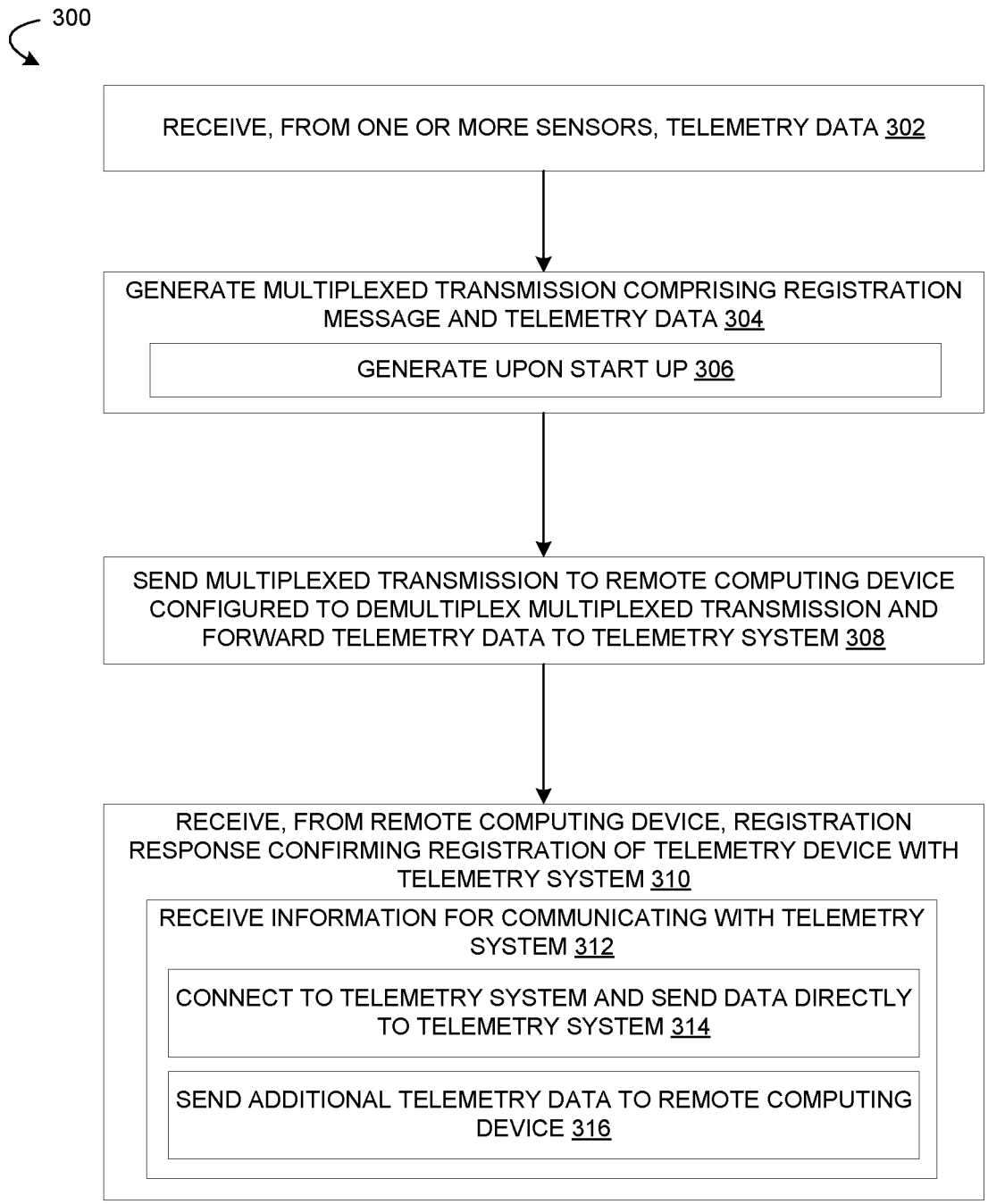
FIG. 3 is a flowchart illustrating an example method for providing a registration message multiplexed with telemetry data to an IoT endpoint.

FIG. 3 illustrates an example method 300 operable by a telemetry device to send a registration message multiplexed with telemetry data to a single endpoint for registration and telemetry reporting. Method 300 may be used, for example, for stateless provisioning and telemetry data transmission. Method 300 may be implemented as stored instructions executable by a logic subsystem of a telemetry device, such as telemetry devices 102, 104, 202, 500, and/or 602.

At 302, method 300 comprises receiving telemetry data from one or more sensors. The telemetry data may comprise raw data (e.g. digitized sensor output), and/or may comprise processed sensor data (e.g. a report regarding a threshold condition being met by the sensor data). At 304, method 300 comprises generating, via a multiplexer, a multiplexed transmission comprising a registration message and the telemetry data. In some examples, a telemetry device may be configured to generate the multiplexed transmission upon a device start-up, as indicated at 306.

At 308, method 300 comprises sending the multiplexed transmission to a remote computing device configured to demultiplex the multiplexed transmission and forward the telemetry data to a telemetry system. Sending the multiplexed transmission to the remote computing device may comprise sending the multiplexed transmission to an IoT provisioning system.

At 310, method 300 comprises receiving a registration response from the remote computing device, wherein the registration response confirms registration of the telemetry device with the telemetry system. In some examples, receiving the registration response comprises receiving information usable to communicate with the telemetry system, as indicated at 312. In some such examples, the telemetry device then may connect to the telemetry system and send data directly to the telemetry system, as indicated at 314. In other examples, the telemetry device may send additional telemetry data to the remote computing device, as indicated at 316, in addition or alternatively to sending data directly to the telemetry system. In yet other examples, the telemetry device may repeat method 300 for each transmission of telemetry data.

Figure 4:
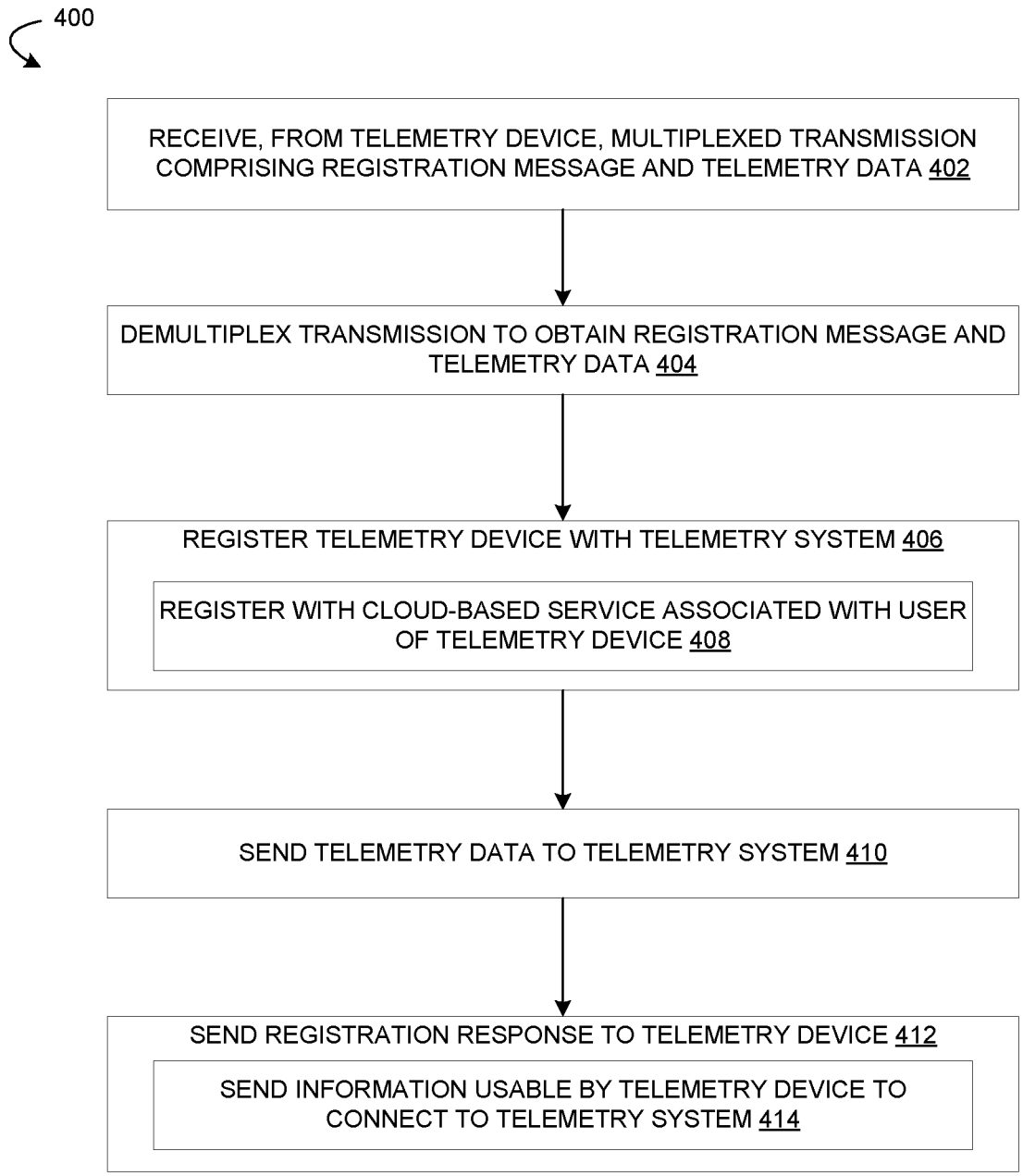
FIG. 4 is a flowchart illustrating an example method for registering a telemetry device with a telemetry system and reporting telemetry data to the telemetry system on behalf of the telemetry device.

FIG. 4 illustrates an example method 400 for registering a telemetry device with a telemetry system and reporting telemetry data to a telemetry system on behalf of the telemetry device. Method 400 may be implemented as stored instructions executable by a logic subsystem of a provisioning system, such as the IoT endpoint 106 and/or the provisioning system 208.

At 402, method 400 comprises receiving, from a telemetry device, a multiplexed transmission comprising a registration message and telemetry data. At 404, method 400 comprises demultiplexing, via a demultiplexer of the provisioning system, the multiplexed transmission to obtain the registration message and the telemetry data. Based on the registration message extracted from the multiplexed transmission, method 400 comprises, at 406, registering the telemetry device with a telemetry system. Registering the telemetry device with the telemetry system may comprise creating a device ID for the telemetry device, sending the device ID to the telemetry system, and receiving a device response from the telemetry system. In some examples, registering the telemetry device with the telemetry system comprises registering the telemetry device with a cloud-based service associated with a user of the telemetry device, as indicated at 408.

After registering the telemetry device with the telemetry system, method 400 comprises, at 410, sending the telemetry data obtained from the multiplexed transmission to the telemetry system. The provisioning system may store the telemetry data at least until the telemetry system provides a device response for the telemetry device, at which point the provisioning system forwards the telemetry data to the telemetry system. In some examples, the telemetry data may cease to persist in data storage of the provisioning system after being forwarded to the telemetry system.

At 412, method 400 comprises sending a registration response to the telemetry device, wherein the registration response confirms registration of the telemetry device with the telemetry system. Optionally, the registration response may inform the telemetry device that the telemetry system received the telemetry data. In some examples, sending the registration response additionally or alternatively comprises sending information usable by the telemetry device to connect to the telemetry system and send data directly to the telemetry system, as indicated at 414.

In some instances, a telemetry device may naturally operate within a defined geographical region. For example, a thermostat temperature sensor or a security camera may be generally stationary once installed in a use environment. Likewise, various vehicles, such as construction equipment, shopping carts, etc. may be associated with particular geographic area (e.g. a construction site or storage yard, a grocery store and surrounding parking lot, etc.). When such a telemetry device leaves the associated geographical area, it is possible that the device may have been stolen or otherwise moved without authorization. In such instances, it may be desirable to limit use of the telemetry device, or take other ameliorative actions.

Thus, a telemetry system may be configured to monitor a geolocation of the telemetry device, and control use of the telemetry device based upon the geolocation falling outside of a defined operating region. Reauthorization of the device then may be required before ordinary use of the telemetry device is restored. In some examples, the intake of telemetry data by a telemetry service may be restricted until reauthorization is performed. In other examples, telemetry device operation may be restricted (whether partially impeded or fully shut down) until reauthorization is performed. In yet other examples, telemetry data collection may continue, but for the purpose of detecting theft or other unauthorized movement of the device, rather than for routine telemetry purposes (e.g. by continuing to collect image data, acoustic data, and/or location data). In any of these instances, an owner and/or authorized user of the telemetry device may receive an alert regarding a reported location of the telemetry device outside of its operating region. These actions may provide a measure of theft protection and/or damage prevention for a telemetry device.

As an example, a telemetry device in the form of a shopping cart may be configured to operate within an associated retail store and a parking area adjacent to the retail store. As such, if the shopping cart is moved to a location outside of its designated operating bounds, data collected by the shopping cart while outside the designated operating bounds may decrease the relevance of a shopping cart tracking data set stored by the telemetry system for the retail store. As such, data from the shopping cart may not be saved in the data set until after reauthorization. As another example, a telemetry device in the form of a golf cart may be configured to operate within a perimeter of a golf course. To prevent theft of golf course vehicles, the telemetry system may send a command to the telemetry device to restrict operation—e.g. by disabling operation of an electric motor of the golf cart—when the telemetry device reports a location outside of the golf course property until reauthorization is performed. Other example telemetry devices that may be controlled based upon geolocation include other vehicles (heavy machinery, luggage carts, drones, bicycles, etc.), soil sensors, water quality sensors, shipping containers, and any other device configured to report data for a particular location/geographical region.

Figure 5B:
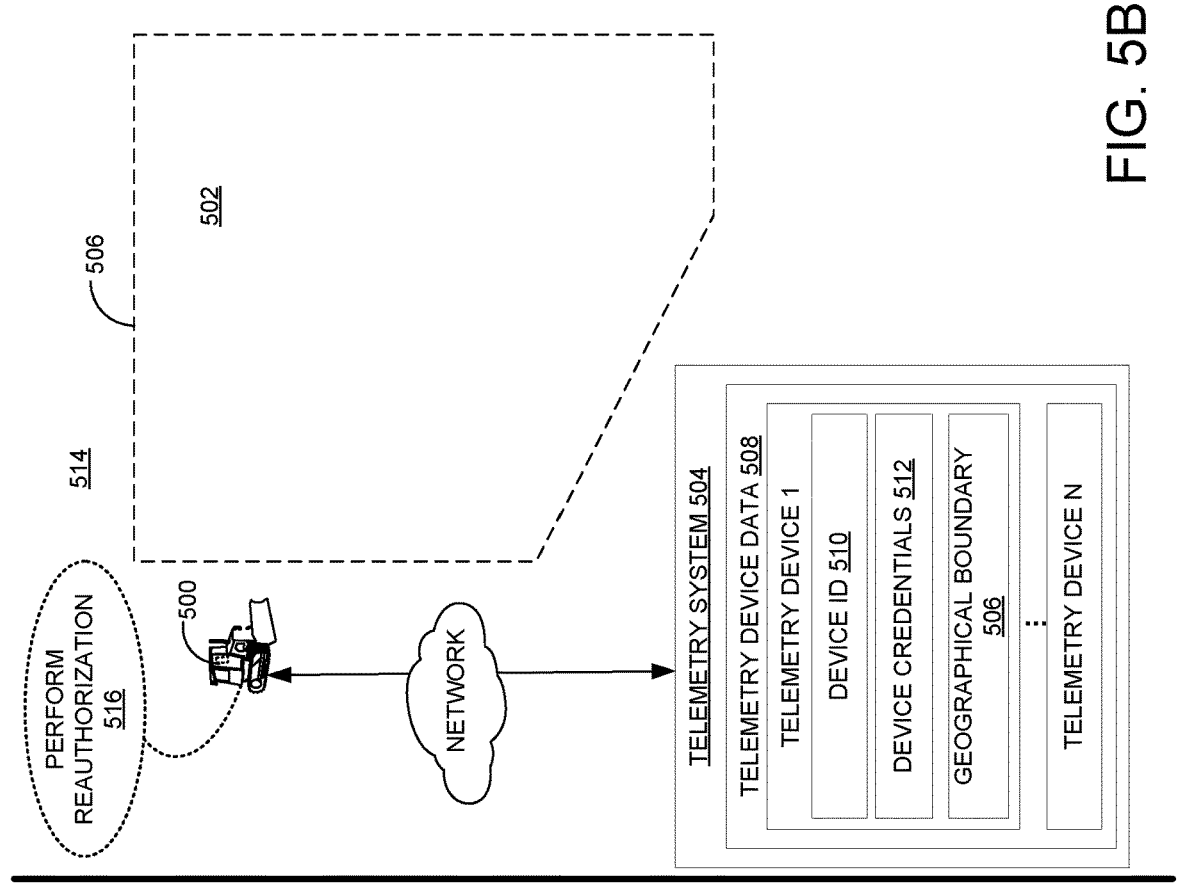
FIGS. 5A and 5B schematically show an example use scenario in which a telemetry device is requested to perform a reauthorization process after leaving a predefined geographical boundary.
Figure 5A:
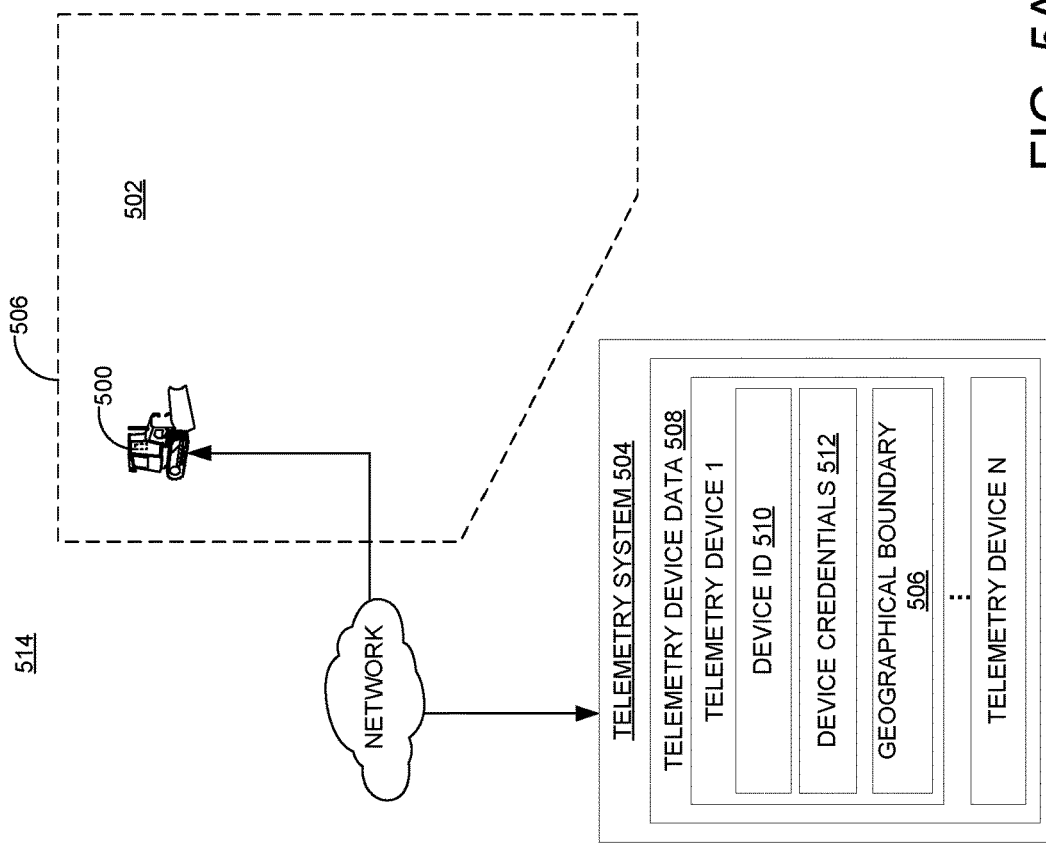

FIG. 5A depicts an example scenario in which a telemetry device 500 in the form of a construction vehicle is configured to operate within a work site 502. Briefly, the telemetry device 500 is registered with a telemetry system 504 as being intended for use within a particular geographical boundary 506. The telemetry system 504 then monitors a geolocation of the telemetry device 500 to determine whether the telemetry device 500 is operating within the geographical boundary 506 based, for example, on GPS data, and controls use of the telemetry device 500 based on whether the geolocation of the telemetry device 500 is outside the geographical boundary 506.

The telemetry system 504 stores telemetry device data 508 for each telemetry device 1 through N associated with the work site 502 (only one of which is shown in the example of FIGS. 5A and 5B as telemetry device 500). For each telemetry device, the telemetry device data 508 comprises a device ID 510, security credentials 512, and a geographical boundary 506 within which the telemetry device is expected to be located. In some examples, each telemetry device 1 through N registered with the telemetry system 504 may be assigned to a different geographical boundary which may be linked to a respective device ID of the telemetry device. In other examples, the telemetry devices 1 through N registered with the telemetry system 504 may each be assigned to a same geographical boundary.

In FIG. 5B, the telemetry device 500 has been moved to a location 514 outside of the geographical boundary 506. In some examples, the telemetry device 500 reports this location, and the telemetry system 504 determines that the reported location is not within the geographical boundary 506. In other examples, the crossing of the geographical boundary 506 may be detected locally on the telemetry device, and the crossing reported as an event to the telemetry system 504. In either case, the telemetry system 504 may take one or more actions towards restricting use of the telemetry device 500, such as not receiving data from the telemetry device into telemetry system 504 until reauthorization is performed.

The telemetry system 504 also may take an action towards restricting use of the telemetry device 500 by sending an alert 516 regarding the location outside the geographical boundary, for example, to notify an owner, operator and/or other authorized person of the unauthorized location. As shown in FIG. 5B, the alert 516 may request reauthorization, and may prompt an operator to return the telemetry device 500 to the associated operating region 502. Such an alert 516 may be output by the telemetry device 500, as shown in FIG. 5B, and/or output to a device (e.g. a smartphone) associated with an owner of the telemetry device 500.

As another example, the telemetry system 504 may restrict use of the telemetry device 500 by sending a command to impede operation of the telemetry device 500 while the telemetry device 500 is located outside of the geographical boundary 506. As an example, for the bulldozer telemetry device 500 in FIG. 5B, the telemetry system 504 may send a command to disable operation of a power system of the bulldozer. This may help to prevent damage by an unauthorized user. As another example, the telemetry system 504 may take action towards restricting use of the telemetry device 500 by shutting down the telemetry device 500 until reauthorization is performed.

In some instances, an operator of the telemetry device 500 may move the telemetry device 500 off-site, such as to move the telemetry device 500 to a different work site. In such instances, the operator may perform a manual override to reauthorize the telemetry device 500 and remove any previously-imposed impediment on device use. This (and other possible reauthorization processes, such as password entry, biometric authentication, etc.) may be performed, for example, via a dashboard for the telemetry system 504 accessible using a web browser or application by an authorized user/owner of the telemetry device 500. The operator further may redefine the geographical boundary for the device 500 to correspond to the different work site. As another example, a store owner may intentionally transfer a shopping cart between two retail store locations. The shopping cart may be associated with a geographical boundary for a first retail store based on its registration to a telemetry system for the first retail store or based on a geographical boundary linked to its device ID. When the shopping cart is moved outside the geographical boundary for the first retail store, the telemetry system for the first store may send the store owner an alert indicating that the telemetry device is in an unauthorized location, and may take an action to impede use of the telemetry device (e.g. by locking the wheels). The store owner may respond to this notification (e.g. via a website or mobile application dashboard for the telemetry system) to authorize the move of the shopping cart and to specify that the shopping cart will be associated with the second store. The telemetry system for the first retail store may rescind the action towards restricting use of the shopping cart and reassign the shopping cart to a geographical boundary for the second retail store. In instances that the second retail store is associated with a different telemetry system (e.g. a different IoT hub) than the first retail store, the shopping cart may be reassigned to the geographical boundary for the second retail store upon registering/provisioning to the telemetry system for the second store.

Figure 6:
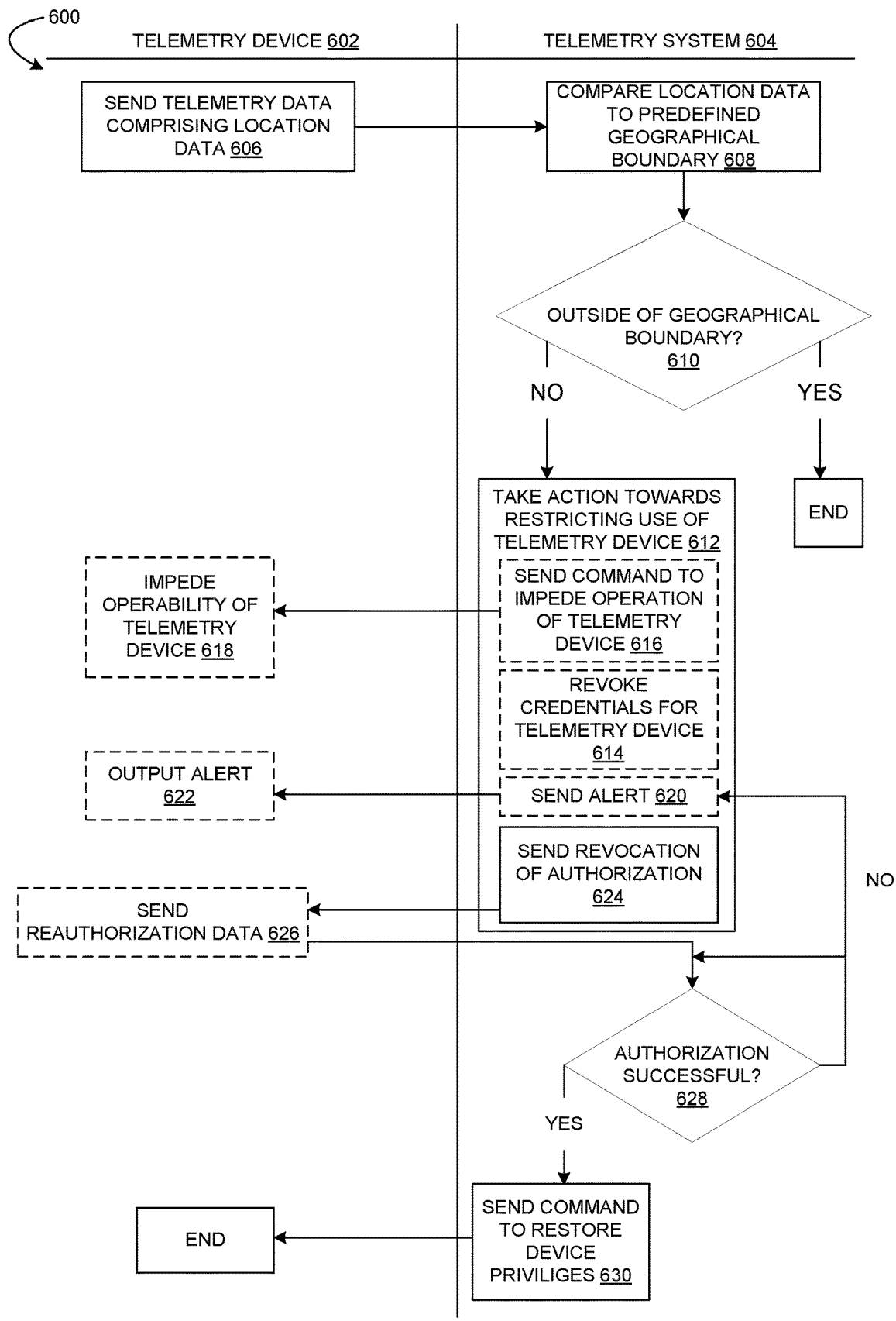
FIG. 6 is a flowchart illustrating an example data exchange between a telemetry device and a cloud-based service that selectively restricts use of a telemetry device based upon a geolocation of the telemetry device.

FIG. 6 illustrates a flow diagram illustrating an example method 600 of restricting use of a telemetry device 602 by a telemetry system 604. In some examples, the telemetry system 604 may take the form of Software as a Service (SaaS), Platform as a Service (PaaS), or application PaaS (aPaaS). In other examples, aspects of the telemetry system 604 may be implemented as stored instructions executable by a logic subsystem of the telemetry device 602 itself, or a network edge device residing between the telemetry device 602 and the telemetry system 604.

Method 600 comprises, at the telemetry device 602, reporting telemetry data comprising location data to the telemetry system 604, as indicated at 606. In some examples, the telemetry device 602 may report location data without any other accompanying telemetry data. In other examples, the telemetry device 602 may report location data and other sensor data. The location data may comprise any suitable type of data, including GPS data and an IP address location data.

At 608, the telemetry system 604 compares the location data received to a predefined geographical boundary for the telemetry device 602. In some examples, comparing the location data to the defined geographical boundary comprises comparing the location data to a geographical boundary linked to a telemetry system with which the telemetry device is registered. In other examples, comparing the location data to the defined geographical boundary comprises comparing the location data to a geographical boundary linked to a device ID of the telemetry device.

In some examples, the predefined geographical boundary also may include temporal constraints. Thus, comparing the location data to a defined geographical boundary may further comprise comparing a timestamp or other time information associated with the location data to a temporal constraint for the defined geographical boundary. For example, when the telemetry device 602 comprises a shipping container configured to be transported between locations, a predefined geographical boundary for the shipping container may comprise time constraints specifying when the shipping container is expected to be within (or expected to leave) each of multiple geographical boundaries, such as those defined by country, state, and/or city perimeters. Further, the telemetry system 604 may utilize multiple factors of authentication to verify whether the telemetry device 602 is within or outside the predefined geographical boundary. For example, the telemetry system 604 may corroborate whether a GPS coordinate reported by the telemetry device 602 is valid via an IP address of the telemetry device 602.

The telemetry device 602 may report location data to the telemetry system 604 at any suitable frequency. The frequency of reporting may depend upon hardware constraints of the telemetry device 602, such as battery life, and/or bandwidth constraints of a network over which the telemetry device 602 and the telemetry system 604 communicate. For example, a telemetry device connected to a local power source may be configured to report location data more frequently than a telemetry device without access to a local power source. In yet other examples, the location data may be reported based upon the occurrence of events (e.g. a detected crossing of a geographical boundary), rather than at a selected frequency.

Based on the comparison at 608, the telemetry system 604 determines, at 610, whether the location reported by the telemetry device 602 is outside of the defined geographical boundary. If the location is not outside the predefined geographical boundary for the telemetry device 602, then method 600 ends. If the location is outside the predefined geographical boundary for the telemetry device 602, then method 600 proceeds to 612, where the telemetry system 604 takes an action towards restricting use of the telemetry device 602.

The telemetry system 604 may take any suitable action towards restricting use of the telemetry device 602. In some instances, the telemetry system 604 may revoke credentials for the telemetry device 602 so that the telemetry device is unable to connect to the telemetry system 604 using those credentials, and require reauthorization before the provision of telemetry data to the telemetry system may resume. This may, for example, help prevent data collected by the telemetry device 602 outside of the predefined geographical boundary from reducing a relevance of a data set stored in the telemetry system 604 for the defined geographical boundary. Further, in some instances, the telemetry system 604 may send a command to impede operation of the telemetry device 602, as indicated at 616. In response, the telemetry device 602 may reduce its functionality, as indicated at 618. Further, in some examples, the cloud-based service 604 may send an alert for output by the telemetry device 602 and/or for output by a device (e.g. a mobile device) associated with an authorized user or owner of the telemetry device 602, as indicated at 620. In response, the telemetry device 602 and/or the device associated with a user of the telemetry device 602 may output the alert, as indicated at 622.

In any of these instances, the telemetry system 604 also may send a revocation of authorization, and require reauthorization to restore ordinary telemetry device use, as indicated at 624. In response, the telemetry device 602 may send reauthorization data, such as location data and/or a user input to the telemetry device, as indicated at 626. In addition or alternatively, the telemetry system may receive reauthorization data from an owner/administrator of the telemetry system 604, e.g. via a web portal or application for the telemetry system 604. At 628, if reauthorization of the telemetry device 602 is successful, then a command is sent at 630 to restore ordinary use of the telemetry device. This may include removing a previously-imposed impediment to device use and/or restoring connection information for connecting with the telemetry system 604. Where re-authorization is not successful, method 600 maintains use restrictions for the telemetry device 602, and may send an additional alert regarding the reauthorization failure, as indicated.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
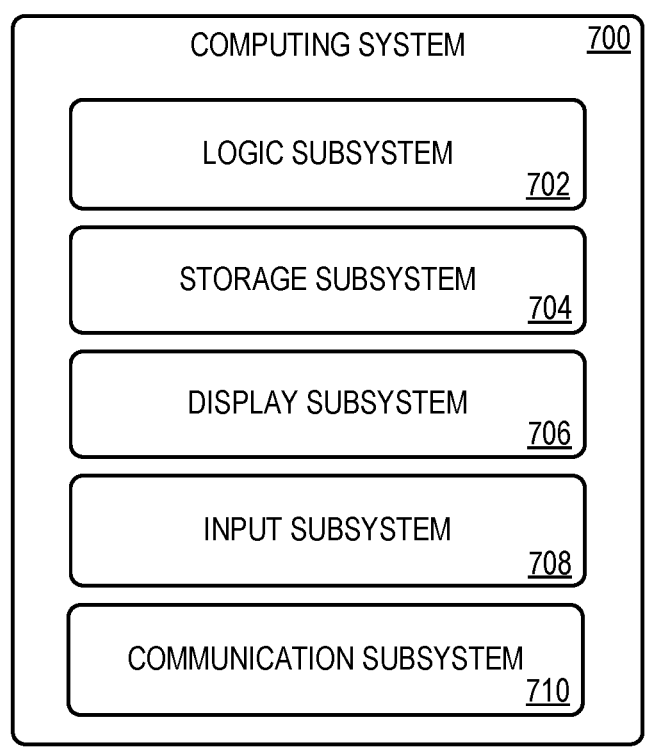
FIG. 7 is a block diagram illustrating an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 702 may include one or more processors configured to execute software instructions. Additionally or alternatively, the logic machine may include one or more hardware or firmware logic machines configured to execute hardware or firmware instructions. Processors of the logic machine 702 may be single-core or multi-core, and the instructions executed thereon may be configured for sequential, parallel, and/or distributed processing. Individual components of the logic machine 702 optionally may be distributed among two or more separate devices, which may be remotely located and/or configured for coordinated processing. Aspects of the logic machine 702 may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 700 implemented to perform a particular function. In some cases, a program may be instantiated via logic machine 702 executing instructions held by storage machine 704. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem 708 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a method comprising receiving a multiplexed transmission from a telemetry device, the multiplexed transmission comprising a registration message and telemetry data, demultiplexing the multiplexed transmission to obtain the registration message and the telemetry data, registering the telemetry device with a telemetry system based upon the registration message, sending the telemetry data to the telemetry system, and sending a registration response to the telemetry device, the registration response confirming registration of the telemetry device with the telemetry system. In such an example, sending the registration response to the telemetry device may additionally or alternatively comprise sending information usable by the telemetry device to connect to the telemetry system. In such an example, registering the telemetry device with the telemetry system may additionally or alternatively comprise registering the telemetry device with a cloud-based service associated with a user of the telemetry device. In such an example, the telemetry data may additionally or alternatively comprise location data, and the method may additionally or alternatively comprise comparing the location data received to a predefined physical boundary for the telemetry device, and when the location data does not meet a predefined condition with regard to the defined physical boundary, then taking an action towards restricting use of the telemetry device. In such an example, taking the action towards restricting the use of the telemetry device may additionally or alternatively comprise ceasing sending of the telemetry data received from the telemetry device to the telemetry system. In such an example, taking the action towards restricting the use of the telemetry device may additionally or alternatively comprise one or more of sending an alert to one or more of the telemetry device and/or the telemetry system and sending a command to the telemetry device to restrict operability of the telemetry device.

Another example provides a telemetry device comprising a multiplexer, one or more sensors, a logic subsystem comprising one or more processing devices, and memory storing instructions executable by the logic subsystem to receive, from the one or more sensors, telemetry data, generate, via the multiplexer, a multiplexed transmission comprising a registration message and the telemetry data, send the multiplexed transmission to a remote computing device configured to demultiplex the multiplexed transmission and forward the telemetry data to a telemetry system, and receive, from the remote computing device, a registration response confirming registration of the telemetry device with the telemetry system. In such an example, the registration response may additionally or alternatively comprise information for communicating with the telemetry system, and the instructions may additionally or alternatively be executable to, after receiving the registration response, connect to the telemetry system and send data directly to the telemetry system. In such an example, the instructions may additionally or alternatively be executable to generate the multiplexed transmission upon telemetry device start up. In such an example, the instructions may additionally or alternatively be executable to power off after receiving the registration response from the remote computing device, and to generate another multiplexed transmission upon a later start-up of the telemetry device. In such an example, the instructions may additionally or alternatively be executable to, after receiving the registration response, send additional telemetry data to the remote computing device. In such an example, the telemetry device may additionally or alternatively comprise a microcontroller unit (MCU). In such an example, the one or more sensors may additionally or alternatively comprise one or more of a temperature sensor, a pressure sensor, a touch sensor, a global positioning system (GPS) sensor, a moisture sensor, a motion sensor, a water quality sensor, a chemical sensor, a level sensor, an image sensor, a smoke sensor, an acoustic sensor, and/or a gas detector/sensor.

Another example provides a method comprising receiving telemetry data from a telemetry device, the telemetry data comprising location data, comparing the location data to a defined geographical boundary for the telemetry device, and when the location data does not meet a predefined condition with regard to the defined geographical boundary, then taking an action towards restricting use of the telemetry device. In such an example, the telemetry device may additionally or alternatively comprise a vehicle. In such an example, taking the action towards restricting the use of the telemetry device may additionally or alternatively comprise sending a command to the telemetry device to reduce operability of the telemetry device. In such an example, taking the action towards restricting the use of the telemetry device may additionally or alternatively comprise ceasing communication from the telemetry device to the telemetry system. In such an example, taking the action towards restricting the use of the telemetry device may additionally or alternatively comprise sending an alert regarding the location not meeting the predefined condition. In such an example, taking the action towards restricting the use of the telemetry device may additionally or alternatively comprise sending a command to perform a reauthorization process. In such an example, the method may additionally or alternatively comprise receiving reauthorization data, and in response to the reauthorization data meeting a predefined reauthorization condition, sending a command to remove a previously-imposed impediment on the use of the telemetry device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method, comprising:
receiving, via an application programming interface (API), a multiplexed transmission from a telemetry device, the multiplexed transmission comprising a registration message and telemetry data;
demultiplexing the multiplexed transmission to obtain the registration message and the telemetry data;
registering the telemetry device with a telemetry system based upon the registration message;
sending the telemetry data to the telemetry system;
sending a registration response to the telemetry device, the registration response confirming registration of the telemetry device with the telemetry system; and
receiving, via the API, an additional transmission from the telemetry device, the additional transmission comprising additional telemetry data without a registration message.

2. The method of claim 1, wherein sending the registration response to the telemetry device comprises sending information usable by the telemetry device to connect to the telemetry system.

3. The method of claim 1, wherein registering the telemetry device with the telemetry system comprises registering the telemetry device with a cloud-based service associated with a user of the telemetry device.

4. The method of claim 1, wherein the telemetry data comprises location data, the method further comprising
comparing the location data received to a predefined physical boundary for the telemetry device; and
when the location data does not meet a predefined condition with regard to the predefined physical boundary, then taking an action towards restricting use of the telemetry device.

5. The method of claim 4, wherein taking the action towards restricting the use of the telemetry device comprises ceasing sending of the telemetry data received from the telemetry device to the telemetry system.

6. The method of claim 4, wherein taking the action towards restricting the use of the telemetry device comprises one or more of sending an alert to one or more of the telemetry device and/or the telemetry system and sending a command to the telemetry device to restrict operability of the telemetry device.

7. A telemetry device, comprising:
a multiplexer;
one or more sensors;
a logic subsystem comprising one or more processing devices; and
memory storing instructions executable by the logic subsystem to
receive, from the one or more sensors, telemetry data;
generate, via the multiplexer, a multiplexed transmission comprising a registration message and the telemetry data;

send, via an application programming interface (API), the multiplexed transmission to a remote computing device configured to demultiplex the multiplexed transmission and forward the telemetry data to a telemetry system;

receive, from the remote computing device, a registration response confirming registration of the telemetry device with the telemetry system; and send, via the API, an additional transmission comprising additional telemetry data without a registration message.

8. The telemetry device of claim 7, wherein the registration response comprises information for communicating with the telemetry system, and wherein the instructions are further executable to, after receiving the registration response, connect to the telemetry system and send data directly to the telemetry system.

9. The telemetry device of claim 7, wherein the instructions are executable to generate the multiplexed transmission upon telemetry device start up.

10. The telemetry device of claim 9, wherein the instructions are further executable to power off after receiving the registration response from the remote computing device, and to generate another multiplexed transmission upon a later start-up of the telemetry device.

11. The telemetry device of claim 7, wherein the telemetry device comprises a microcontroller unit (MCU).

12. The telemetry device of claim 7, wherein the one or more sensors comprise one or more of a temperature sensor, a pressure sensor, a touch sensor, a global positioning system (GPS) sensor, a moisture sensor, a motion sensor, a water quality sensor, a chemical sensor, a level sensor, an image sensor, a smoke sensor, an acoustic sensor, and/or a gas detector/sensor.

13. A method, comprising:
receiving, via an application programming interface (API), a multiplexed transmission from a telemetry device, the multiplexed transmission comprising a registration message and telemetry data comprising location data;

demultiplexing the multiplexed transmission to obtain the location data;

comparing the location data to a defined geographical boundary for the telemetry device;

receiving, via the API, an additional transmission from the telemetry device, the additional transmission comprising additional telemetry data without a registration message; and when the location data does not meet a predefined condition with regard to the defined geographical boundary, then taking an action towards restricting use of the telemetry device.

14. The method of claim 13, wherein the telemetry device comprises a vehicle.

15. The method of claim 13, wherein taking the action towards restricting the use of the telemetry device comprises sending a command to the telemetry device to reduce operability of the telemetry device.

16. The method of claim 13, wherein taking the action towards restricting the use of the telemetry device comprises ceasing communication from the telemetry device to the telemetry system.

17. The method of claim 13, wherein taking the action towards restricting the use of the telemetry device comprises sending an alert regarding the location not meeting the predefined condition.

18. The method of claim 13, wherein taking the action towards restricting the use of the telemetry device comprises sending a command to perform a reauthorization process.

19. The method of claim 18, further comprising receiving reauthorization data, and in response to the reauthorization data meeting a predefined reauthorization condition, sending a command to remove a previously-imposed impediment on the use of the telemetry device.

* * * * *